US012762969B2

(12) United States Patent
Huang

(10) Patent No.: US 12,762,969 B2
(45) Date of Patent: Oct. 13, 2026

(54) AIRCRAFT GROUND ANTI-COLLISION SYSTEM AND METHOD

(71) Applicant: AIRBUS (S.A.S.), Blagnac (FR)

(72) Inventor: Jinming Huang, Beijing (CN)

(73) Assignee: AIRBUS (S.A.S.), Blagnac (FR)

( * ) Notice: Subject to any disclaimer, the term of this patent is extended or adjusted under 35 U.S.C. 154(b) by 135 days.

(21) Appl. No.: 18/775,593

(22) Filed: Jul. 17, 2024

(65) Prior Publication Data

US 2025/0029505 A1 Jan. 23, 2025

(30) Foreign Application Priority Data

Jul. 19, 2023 (CN) ........................ 202310892450.5

(51) Int. Cl.

*G08G 5/80* (2025.01)
*G06T 15/10* (2011.01)
*G06V 20/58* (2022.01)
*G08G 5/20* (2025.01)

(52) U.S. Cl.

CPC ............... *G08G 5/80* (2025.01); *G06T 15/10* (2013.01); *G06V 20/58* (2022.01); *G08G 5/20* (2025.01); *G06T 2200/24* (2013.01)

(58) Field of Classification Search

CPC ........... G08G 5/80; G08G 5/20; G06T 15/10; G06T 2200/24; G06V 20/58

See application file for complete search history.

(56) References Cited

U.S. PATENT DOCUMENTS

| | | | | |
|---|---|---|---|---|
| 9,047,771 B1 * | 6/2015 | Thoreen | G01C 23/00 |
| 2013/0238214 A1 * | 9/2013 | Perry | G06F 11/30 701/99 |
| 2018/0253983 A1 * | 9/2018 | Ell | G06T 7/55 |
| 2023/0215277 A1 * | 7/2023 | Sakamaki | G01S 13/72 701/120 |

FOREIGN PATENT DOCUMENTS

| | | | | |
|---|---|---|---|---|
| BR | 102015012962 A2 * | 1/2016 | G01S 13/933 |
| CN | 104590573 A * | 5/2015 | |
| CN | 105492985 A * | 4/2016 | G01C 21/3848 |
| DE | 102024109094 A1 * | 10/2025 | B60R 1/31 |

* cited by examiner

*Primary Examiner* — Mary Cheung
(74) *Attorney, Agent, or Firm* — Nixon & Vanderhye, PC

(57) ABSTRACT

An aircraft ground anti-collision system and method is disclosed including multiple sensors including an on-board sensor and an off-board sensor, and an obstacle detection processing unit, which is configured to: process data received from the multiple sensors to detect an object around the aircraft and/or a trailer for towing the aircraft, and fuse sensing ranges of the multiple sensors and unify information about the object detected by the multiple sensors in a same coordinate system, to generate a view-angle fused view indicating the detected object. Hence, vision blind areas of a pilot and a ground operator during ground movement of the aircraft can be advantageously eliminated, and the cooperation and scene awareness of the pilot and the ground operator can be improved, thereby reducing the accident rate and improving the safety of the ground movement.

15 Claims, 5 Drawing Sheets

AIRCRAFT GROUND ANTI-COLLISION SYSTEM AND METHOD

CROSS REFERENCE TO RELATED APPLICATION

This application claims the benefit of priority to the following Chinese patent application: Chinese patent application No. 202310892450.5, titled "AIRCRAFT GROUND ANTI-COLLISION SYSTEM AND METHOD", filed with the China National Intellectual Property Administration on Jul. 19, 2023, the entire contents of which is incorporated herein by reference.

FIELD

The present application relates to an aircraft ground anti-collision system and method, and in particular to an aircraft ground anti-collision system and method for eliminating a vision blind area through multi-system cooperation.

BACKGROUND

The content in this section only provides background information related to the present application, which may not constitute the prior art.

An aircraft usually moves on the airport ground in two ways that a pilot controls the aircraft to move on the ground or a trailer driver controls a trailer to tow the aircraft to move on the ground. During an operation of the aircraft on the ground, it is required to avoid people, other aircrafts, buildings and other obstacles around the aircraft at any time, so as to avoid collision. Such collision is particularly likely to occur at a wing tip of the aircraft. At present, there are some on-board anti-collision schemes based on a device mounted on the aircraft and off-board anti-collision schemes based on a device mounted outside the aircraft.

A first on-board anti-collision scheme is based on automatic dependent surveillance-broadcast (ADS-B) technology, that is, the aircraft determines a position of the aircraft through a satellite navigation system and periodically broadcasts the position of the aircraft, so that the aircraft is trackable. The ADS-B scheme is applicable for monitoring the position of the moving aircraft and routing the aircraft to avoid collision. However, lots of aircraft ground collision events occur when an ADS-B device has not been activated normally, for example, when one aircraft is moving by being towed by the trailer while another aircraft is not moving. On the other hand, accuracy of the position detection based on the ADS-B scheme is low, and the error may reach 10 m or more.

In a second on-board anti-collision scheme, an obstacle around the aircraft is detected based on radar. This scheme may be realized with low cost, and it is relatively less affected by light and bad weather, but a spatial resolution of radar detection technology is low. In other words, the shape of an object cannot be accurately identified by a radar device. For example, the aircraft can be displayed only in the form of dot or cross mark on a monitoring dashboard, and the position and shape of a wing tip (such as the outline of the wing tip) of the aircraft cannot be accurately determined by radar. Therefore, it is impossible to accurately avoid the collision between the aircraft and other obstacles through the radar detection technology alone.

In a third on-board anti-collision scheme, an obstacle around the aircraft is detected based on a vision sensor (for example, a pair of cameras mounted on a vertical stabilizer of the aircraft). However, the image quality and sensing accuracy of the vision sensor will be greatly negatively affected under poor light and/or bad weather conditions.

In addition, some off-board anti-collision schemes have been proposed, for example, a portable sensor system is attached to a movable object such as a trailer to detect surrounding obstacles. A disadvantage of this scheme is that the view angle of the portable sensor system is limited and is easy to be blocked, which results in a vision blind area. For example, a camera fixed to the trailer has a limited height and may only capture a low view angle close to the ground and is easily obscured by a fuselage of the aircraft.

On the other hand, in addition to the distance misjudgment and the vision blind area that may be caused by the above hardware issues, collision accidents are usually caused by human errors of a pilot, a trailer driver, a wing protector, a commander and other ground operators, such as inefficient communication between all parties or distraction caused by fatigue. Therefore, it is required to improve the cooperation and scene awareness among all parties.

In summary, it is still required to develop a reliable aircraft ground anti-collision scheme, and in particular, a cooperative aircraft ground anti-collision scheme in which view angles of all parties can be fused to eliminate the vision blind area.

SUMMARY

An object of the present application is to provide an improved aircraft ground anti-collision system and method, so as to eliminate a vision blind area for a pilot and a ground operator during the ground movement of an aircraft. Another object of the present application is to improve the cooperation and scene awareness between the pilot and the ground operator and reduce the accident rate.

According to an aspect of the present application, an aircraft ground anti-collision system is provided. The aircraft ground anti-collision system includes multiple sensors and an obstacle detection processing unit, where the multiple sensors include an on-board sensor located on an aircraft and an off-board sensor located outside the aircraft. The obstacle detection processing unit is configured to: process data received from the multiple sensors to detect an object around the aircraft and/or a trailer for towing the aircraft, and fuse sensing ranges of the multiple sensors and unify information about the object detected by the multiple sensors in a same coordinate system, to generate a view-angle fused view indicating the object.

In some embodiments, the view-angle fused view includes an aerial view and/or a three-dimensional rendering view.

In some embodiments, the on-board sensor may include a distance sensor and/or a vision sensor mounted on the aircraft, and the off-board sensor may include a distance sensor and/or a vision sensor mounted on the trailer.

In some embodiments, the distance sensor may include lidar, and the vision sensor may include a camera.

In some embodiments, at least one sensor mounted on the trailer is configured to be lifted and lowered relative to the trailer.

In some embodiments, the off-board sensor may include a wearable sensor configured to be worn or held by an operator, where the operator includes a wing protector located behind a wing of the aircraft during ground movement of the aircraft.

In some embodiments, the obstacle detection processing unit is configured to perform a risk assessment based on the data received from the multiple sensors and output alarm information in response to detection of an unsafe event. The alarm information may include at least one of a visual alarm, an auditory alarm, and a tactile alarm.

In some embodiments, the obstacle detection processing unit is configured to output the alarm information in response to detection of overspeed and/or presence of a person or an obstacle in a predetermined danger area.

In some embodiments, the aircraft ground anti-collision system may further include multiple user interfaces, configured to communicate with the obstacle detection processing unit and communicate with each other to synchronously share information among multiple operators.

In some embodiments, the multiple user interfaces are configured to receive and display the view-angle fused view generated by the obstacle detection processing unit.

In some embodiments, the multiple user interfaces are configured to transmit the alarm information outputted by the obstacle detection processing unit to an operator.

In some embodiments, each of the multiple user interfaces is configured to send an encoded instruction to the obstacle detection processing unit and/or the remaining of the multiple user interfaces.

In some embodiments, the multiple user interfaces may include a head-up display and/or a head-mounted display device.

According to another aspect of the present application, an aircraft ground anti-collision method is provided. The method includes: processing data received from multiple sensors to detect an object around an aircraft and/or a trailer for towing the aircraft; and fusing sensing ranges of the multiple sensors, unifying information of the object detected by the multiple sensors in a same coordinate system, and outputting a view-angle fused view indicating the object. The multiple sensors include an on-board sensor located on the aircraft and an off-board sensor located outside the aircraft.

In some embodiments, the view-angle fused view may include an aerial view and/or a three-dimensional rendering view.

In some embodiments, the method may further include: performing a risk assessment based on the data from the multiple sensors and outputting alarm information in response to detection of an unsafe event. The alarm information may include at least one of a visual alarm, an auditory alarm, or a tactile alarm.

From the following detailed description, other applications of the present application will become more apparent. It should be understood that, although these detailed descriptions and specific examples show preferred embodiments of the present application, these detailed descriptions and specific examples are intended to achieve the purpose of illustrative description, rather than to limit the present application.

BRIEF DESCRIPTION OF THE DRAWINGS

Embodiments of the present application will be described hereinafter by way of example only, with reference to the accompanying drawings. In the drawings, the same features or components are indicated by the same reference numerals, and the drawings may not necessarily drawn to scale. In the drawings.

DETAILED DESCRIPTION OF THE EMBODIMENTS

Figure 1:
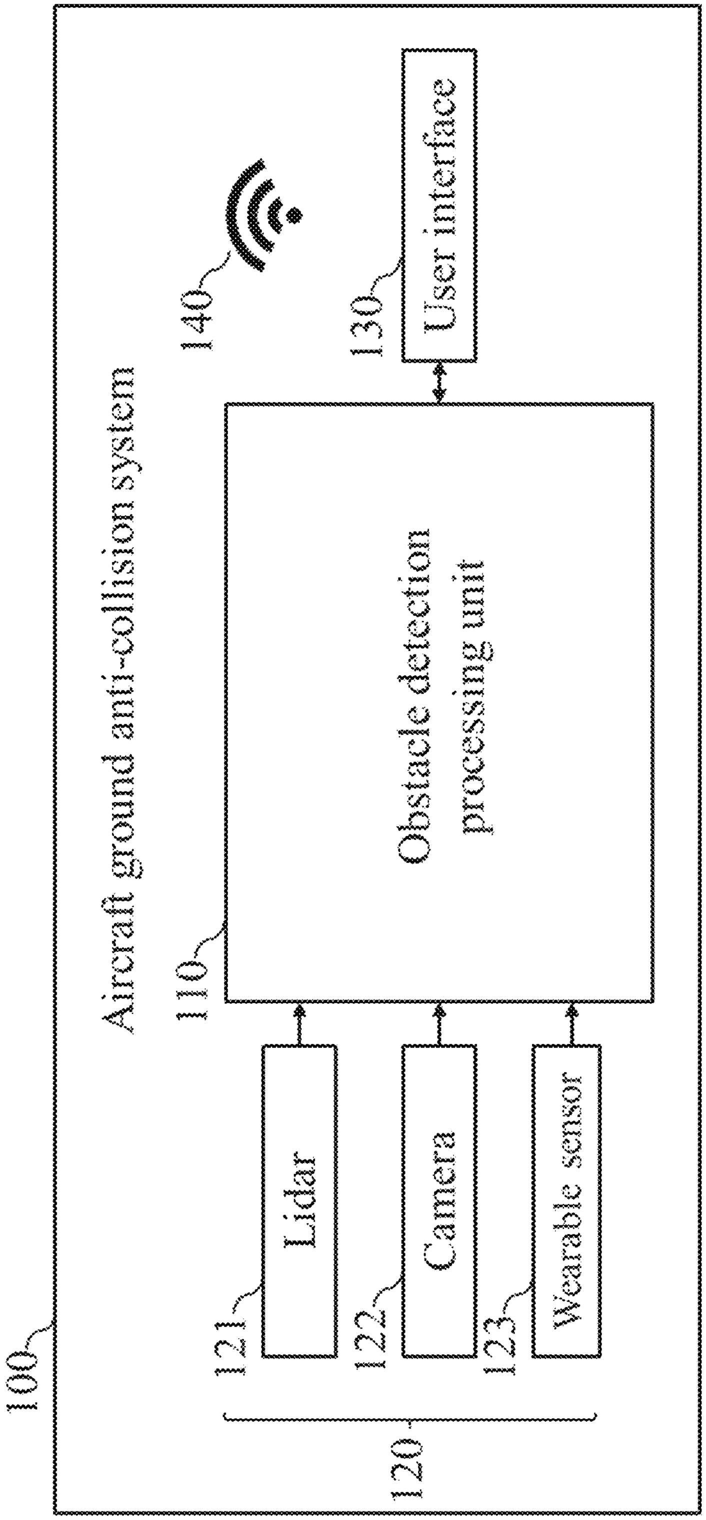
FIG. 1 shows a schematic view of an aircraft ground anti-collision system according to an embodiment of the present application.

The following description is essentially exemplary only, and is not intended to limit the present application, application or usage thereof. It should be appreciated that, throughout all of the drawings, similar reference numerals indicate the same or similar parts or features. The drawings merely schematically show the concepts and principles of the embodiments of the present application, and do not necessarily show the specific dimensions and scales of the embodiments of the present application. Specific parts in specific drawings may be exaggerated to illustrate related details or structures of the embodiments of the present application.

Figure 2:
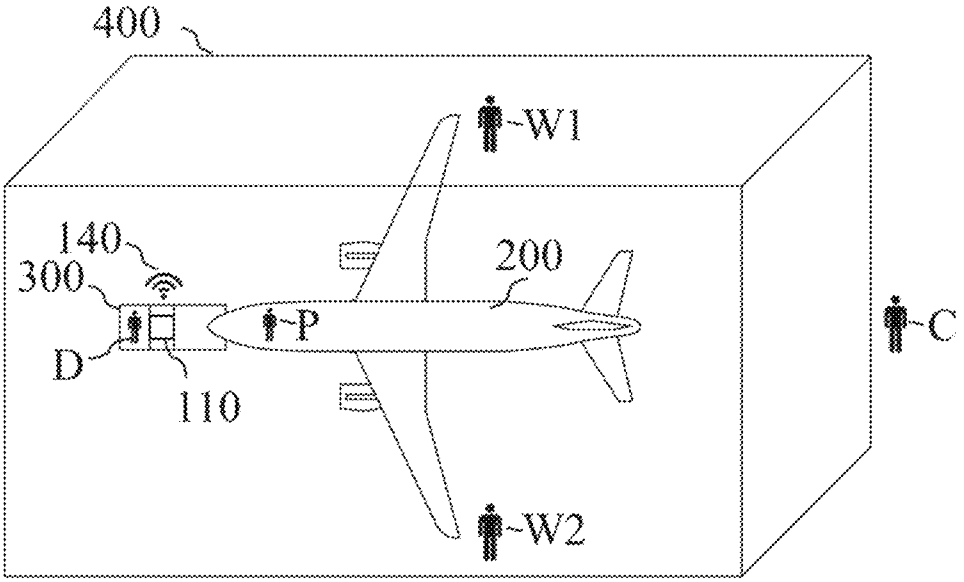
FIG. 2 shows a schematic view of an aircraft and a trailer equipped with the aircraft ground anti-collision system in FIG. 1.

FIG. 1 shows a schematic view of an aircraft ground anti-collision system 100 according to an embodiment of the present application, and FIG. 2 shows a schematic view of an aircraft 200 and a trailer 300 equipped with the aircraft ground anti-collision system 100. FIG. 2 further schematically shows operators that may be involved in an operation of dragging or pushing back the aircraft 200 with the trailer 300, such as a pilot P of the aircraft 200, a driver D of the trailer 300, two wing protectors W1 and W2 located behind wings of the aircraft 200 respectively, and a commander C located behind the aircraft 200. It should be understood that the operation of dragging or pushing back the aircraft 200 may also involve other operator not shown, such as a maintenance engineer.

As shown in FIG. 1, the aircraft ground anti-collision system 100 includes an obstacle detection processing unit 110. The obstacle detection processing unit 110 may be mounted on the trailer 300 or the aircraft 200. The obstacle detection processing unit 110 is configured to process data received from multiple sensors 120 to detect an object around the aircraft 200 and/or the trailer 300. The multiple sensors 120 may include an on-board sensor located on the aircraft 200 and an off-board sensor located outside the aircraft 200. The obstacle detection processing unit 110 may be configured to generate a view-angle fused view indicating the detected object around the aircraft 200 and/or the trailer 300 by fusing view angles or sensing ranges of the multiple sensors 120 based on the data received from the multiple sensors 120. As a result, a vision blind area of a single sensor can be effectively eliminated. The data from the multiple sensors 120 may include, but is not limited to, a captured image, a relative position relative to the aircraft 200 and/or the trailer 300 and an absolute position of the detected object, a size of the object, and the like. As shown in FIG. 1, the multiple sensors 120 may include a distance sensor and/or a vision sensor mounted on the aircraft 200 and/or the trailer 300. The distance sensor may include, for example, lidar 121, and the vision sensor may include a camera 122. In an embodiment, multiple vision sensors may be arranged on the aircraft 200 and the trailer 300, so as to cover a view angle as large as possible. The distance sensor may be positioned on one or both of the aircraft 200 and the trailer 300. The obstacle detection processing unit 110 and at least some of the multiple sensors 120 may be integrated into an integrated device. The multiple sensors 120 may further include various types of wearable sensors 123, such as wearable cameras, to be held or worn by a wing protector, a commander, a maintenance engineer or other ground operators, so as to facilitate reducing the vision blind area, provide a larger field of view, and focus on areas of interest (such as a wing tip and a horizontal tail wing of the aircraft). In other embodiments, the multiple sensors 120 may further include a wheel speed sensor, an acceleration sensor and the like, and alternatively, the multiple sensors 120 may be mounted on any other suitable fixed or movable equipment. The sensor 120 (particularly the vision sensor) mounted on the trailer 300 is preferably configured to be movable, for example lifting or lowering or moving toward the left and right, relative to the trailer 300. For example, at least one of the multiple sensors 120 may be mounted on the trailer 300 through a liftable bracket. Therefore, the sensor 120 may be flexibly mounted on the trailer 300 with different heights, and the height of the view angle of the sensor 120 may be adjusted to prevent the view angle from being blocked. The obstacle detection processing unit 110 may further be configured to receive information indicating the position of the aircraft 200, the trailer 300 and/or the obstacle from information sources other than the multiple sensors 120, which may include, for example, a global positioning system (GPS), an ADS-B system and the like. In addition, the obstacle detection processing unit 110 may further be configured to receive an encoded instruction, for example, indicating the position of the obstacle, a sudden accident, or the like, inputted by a person.

The view-angle fused view generated by the obstacle detection processing unit 110 preferably includes an aerial view. For example, each of the sensors 120 may be spatially located first, and then information, such as the position and the size, of the object(s) detected by the sensors 120 may be unified in the same coordinate system (for example, taking a point on the aircraft 200 as the coordinate origin) by using an algorithm, so that the object(s) detected by all of the sensors 120 can be displayed in an aerial angle of view. The view-angle fused view may further include a three-dimensional rendering view. Similar to the aerial view, each of the sensors 120 may be spatially located first, the information, such as the position and the size, of the object(s) detected by the sensors 120 may be unified in the same coordinate system, and then the three-dimensional rendering view may be generated by rendering an outline of the object three-dimensionally based on the information about the size. In addition, alternatively, the three-dimensional rendering view may be generated based on image stitching of images captured by multiple vision sensors. The three-dimensional rendering view may be configured as a panoramic image with a 360-degree view angle.

The aerial view may provide a global view angle to allow the pilot and the ground operator to fully know the positions of all obstacles within a larger area around the aircraft 200 and/or the trailer 300. The obstacle detection processing unit 110 may further be configured to, based on the generated aerial view, plan possible obstacle avoidance routes for the aircraft 200 and the trailer 300 for reference by the operator. Three-dimensional rendering view may provide a local view angle, to allow the pilot and the ground operator to intuitively perceive the position and shape of obstacles in a smaller range around the aircraft 200 and/or the trailer 300, thereby improving the scene awareness of the pilot and the ground operator.

Figure 3:
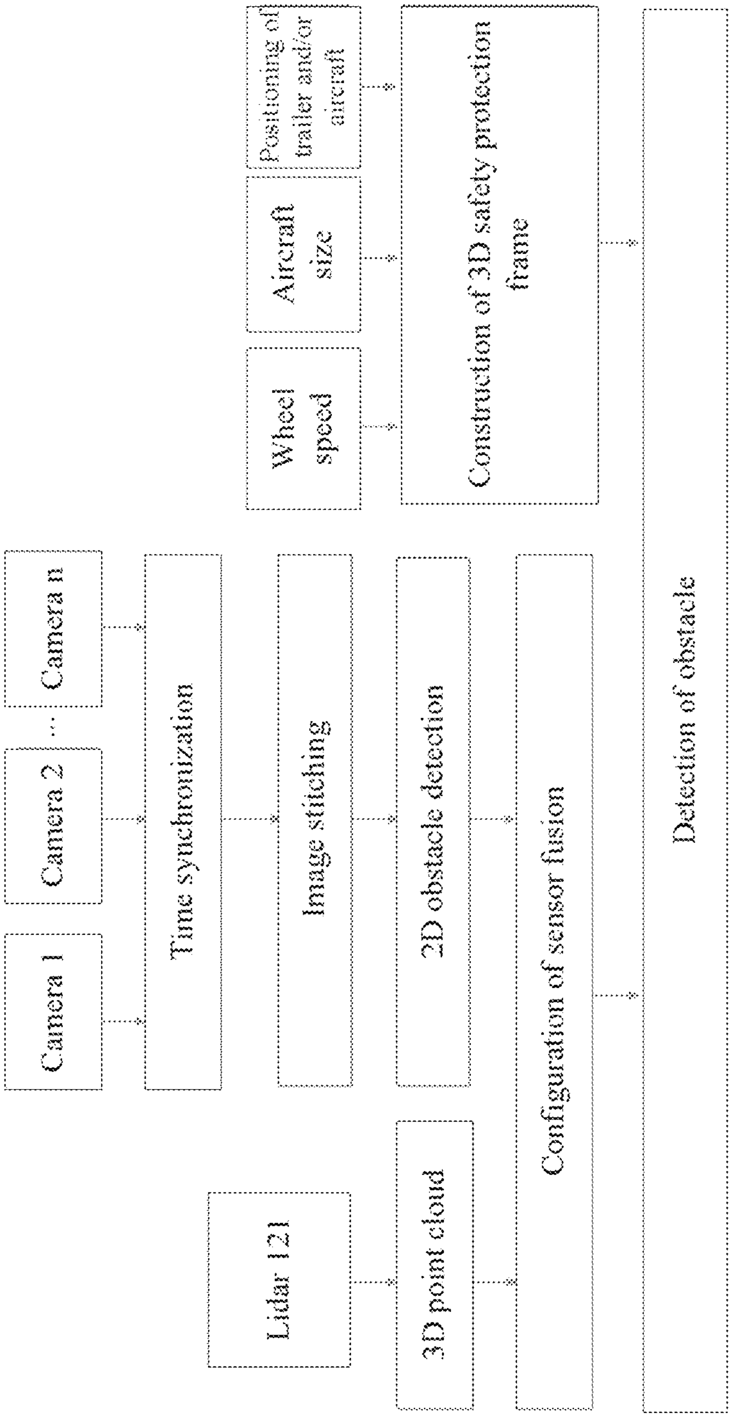
FIG. 3 shows a logical block diagram of an obstacle detection processing unit of the aircraft ground anti-collision system in FIG. 1.

FIG. 3 shows a logic block diagram of obstacle detection processing performed by the obstacle detection processing unit 110 of the aircraft ground anti-collision system 100. The lidar 121 may output three-dimensional obstacle point cloud data to identify and distinguish the ground and an obstacle. Based on the three-dimensional obstacle point cloud data, the area of interest may be filtered out and the data may be clustered. In addition, time synchronization and image stitching are performed on the images captured by the multiple cameras 122 to generate two-dimensional obstacle detection information, such as relative distances between the detected objects and the aircraft 200 and/or the trailer 300, and the relative distances between the objects. Sensor fusion may be configured based on the three-dimensional obstacle point cloud data and the two-dimensional obstacle detection information to generate the view-angle fused view. The sensor fusion may be configured by using any known image stitching or fusion algorithm, which will not be described in detail herein. On the other hand, a virtual 3D safety protection frame 400 (see FIG. 2) for the aircraft 200 may be constructed in real time based on the information, such as the wheel speed of the trailer, the size of the aircraft, and the positioning of the trailer and/or the aircraft. The size of the 3D safety protection frame 400 for the aircraft 200 is determined by adding a safety threshold to the length, the wing span length and the height of the aircraft. The obstacle detection processing unit 110 may determine whether the object is within the 3D safety protection frame 400 of the aircraft 200 based on the detected relative distance between the object and the aircraft 200.

Figure 4:
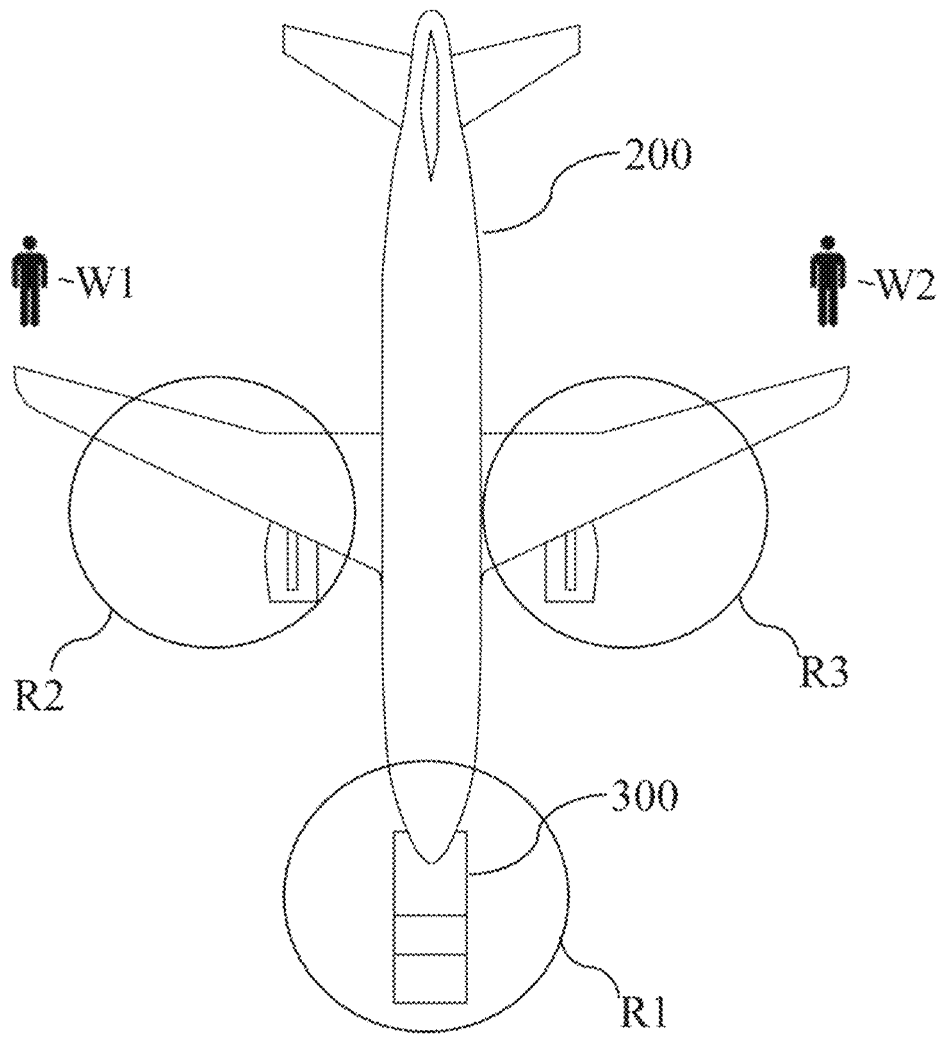
FIG. 4 schematically shows a danger area near an aircraft and a trailer.

In addition, the obstacle detection processing unit 110 may further be configured to perform a risk assessment based on the data received from the sensors 120 and output alarm information to the operator (especially a controller controlling the operation of the aircraft 200, such as a pilot and/or a trailer driver) in response to detection of an unsafe event, so as to avoid accidents. For example, the obstacle detection processing unit 110 may be configured to output the alarm information in response to detection of overspeed and/or presence of a person or an obstacle in the 3D safety protection frame 400, especially in a predetermined area of interest and danger area. The area of interest may include, for example, the area in the vicinity of the wing tip and the tail wing of the aircraft 200. The danger area may be set based on the minimum safety distance specified by the operation requirements. For example, when the aircraft 200 is towed by the trailer 300, the minimum safety distance from an aircraft landing gear or the trailer should be greater than 3 m. FIG. 4 schematically shows danger areas R1, R2 and R3 near the aircraft 200 and the trailer 300. The alarm information may include at least one of a visual alarm, an auditory alarm, or a tactile alarm.

Referring back to FIG. 1, the aircraft ground anti-collision system 100 may further include multiple user interfaces 130. The user interfaces 130 may be arranged at each of the operators related to the aircraft ground anti-collision system 100, including but not limited to the pilot P, the trailer driver D, the wing protectors W1 and W2, the commander C and other ground operators. The user interfaces 130 may be configured to communicate with the obstacle detection processing unit 110 bidirectionally. For example, the user interfaces 130 may be configured to receive and display the view-angle fused view generated by the obstacle detection processing unit 110, and also transmit the alarm information outputted by the obstacle detection processing unit 110 to all related operators. In addition, the user interfaces 130 may be configured to input an encoded instruction to the obstacle detection processing unit 110. On the other hand, the multiple user interfaces 130 may further be configured to communicate with each other. For example, multiple operators, such as the trailer driver, the wing protector, the commander, the pilot and the maintenance engineer, may share information (for example, video streams with a 360-degree view angle around the operators) synchronously through respective user interfaces 130, so that all of the operators may share their awareness of the operating situation synchronously during the operation. In addition, different operators may quickly transmit the alarm information or other information with a simple encoded instruction through respective user interfaces 130. As shown in FIG. 1 and FIG. 2, communication between the obstacle detection processing unit 110 and the user interfaces 130 and communication between the user interfaces 130 may be achieved through a local area network 140. In other embodiments, any other suitable wired or wireless communication mode may be used. For example, when observing an unsafe event, the wing protector W1 shown in FIG. 2 may send an encoded instruction (such as instruction "0") to the trailer driver D or all of the operators including the trailer driver D simultaneously through his/her user interface 130, and the corresponding user interface 130 will trigger visual, auditory and/or tactile alarm information after receiving the encoded instruction, then the trailer driver D will immediately stop the operation of dragging or pushing back, and other operators will also improve their alertness. The user interfaces 130 may include various types of aircraft dashboard, trailer dashboard, display device, alarm device, speaker, microphone and any other suitable input/output devices. In particular, the user interfaces 130 for the ground operators, such as the wing protector and the commander, may be constructed as a wearable or handheld device. The user interfaces 130 preferably include a head-up display (HUD) arranged in a cockpit of the aircraft and/or a cockpit of the trailer and various head-mounted display devices, such as an augmented reality (AR) helmet or glasses, so as to improve the scene awareness of the operators. In addition, the user interface 130 for the operator and the wearable sensor 123 may be integrated into an integrated wearable device.

Figure 5:
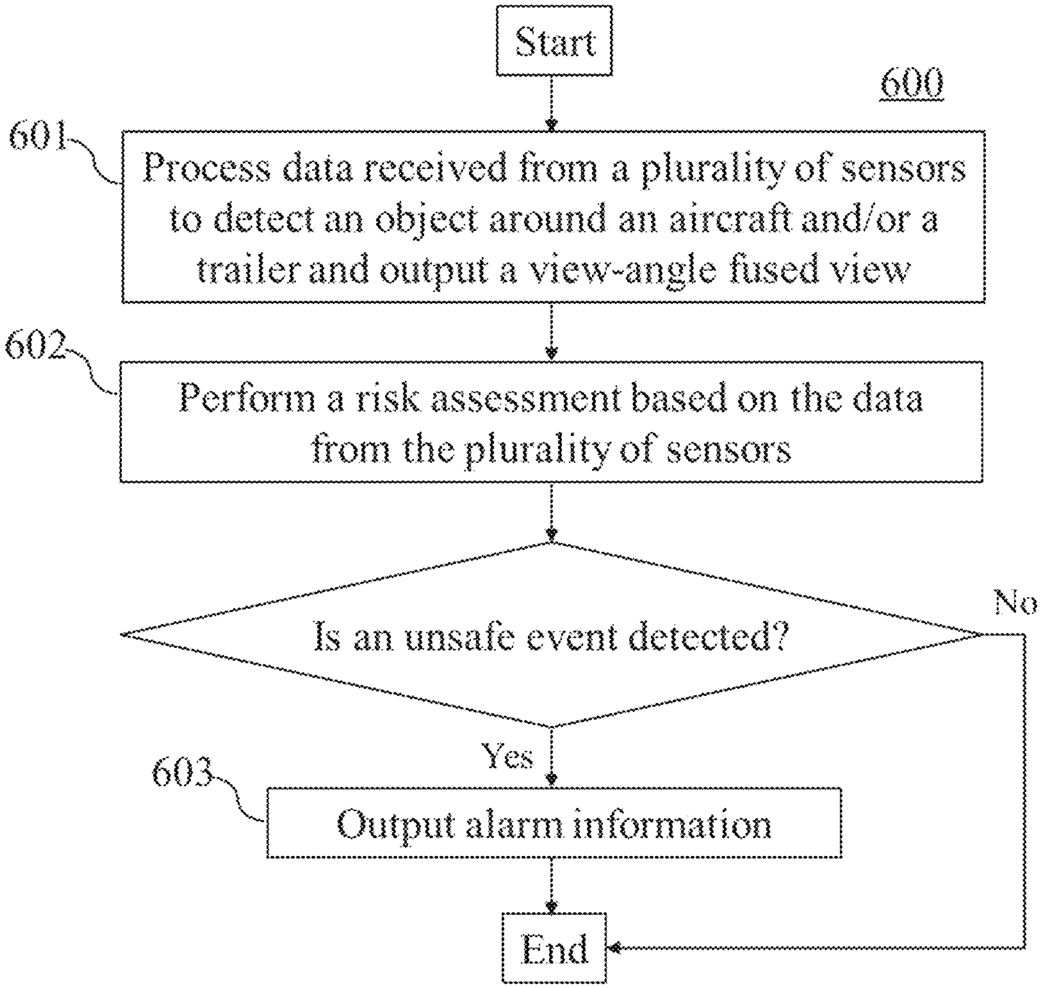
FIG. 5 shows a flowchart of an aircraft ground anti-collision method according to an embodiment of the present application.

FIG. 5 shows a flowchart of an aircraft ground anti-collision method 600 according to an embodiment of the present application. The method includes a step 601 of processing data received from multiple sensors to detect an object around an aircraft and/or a trailer and outputting a view-angle fused view indicating the detected object. In step 601, the view-angle fused view may be generated by fusing sensing ranges of the multiple sensors and unifying information of the object detected by the multiple sensors in the same coordinate system. The view-angle fused view may include an aerial view and/or a three-dimensional rendering view. The method may further include a step 602 of performing a risk assessment based on the data received from the multiple sensors and a step 603 of outputting alarm information in response to detection of an unsafe event.

According to the present application, multiple sensors 120 are arranged at different positions such as the aircraft 200, the trailer 300 and/or the operators, the view-angle fused view, particularly an aerial view, is generated by fusing the view angles or sensing ranges of the multiple sensors 120; integrated scene information may be generated in an interconnected manner based on information from multiple different view angles such as the view angles of the aircraft, the trailer and the ground operator, thereby effectively eliminating the vision blind area of a single operator or a single sensor, and improving the safety of the ground movement of the aircraft. In particular, the wearable sensors arranged on the operators may mainly focus on the areas of interest such as the wing tip and the tail wing, and the vision blind area can be reduced in real time by the operator's subjective initiative. In addition, according to the present application, quick and effective communication between the operators involved during the ground movement of the aircraft is enabled, so as to synchronously share operational situation awareness and quickly transmit the alarm information. As a result, the cooperation and scene awareness of all of the operators can be effectively improved.

The exemplary embodiments of the aircraft ground anti-collision system and method according to the present application have been described in detail herein, but it should be understood that the present application is not limited to the specific embodiments described and illustrated in detail above. Various modifications and variations can be made by those skilled in the art to the present application, without departing from the spirit and scope of the present application. All the variations and modifications shall fall within the scope of the present application. Moreover, all the components described herein can be replaced by other technically equivalent components.

The invention claimed is:

1. An aircraft ground anti-collision system, comprising:

a plurality of sensors, comprising an on-board sensor located on an aircraft and an off-board sensor located outside the aircraft;

an obstacle detection processing unit, configured to: process data received from both the on-board sensor and the off-board sensor to detect an object around the aircraft and/or a trailer for towing the aircraft, and fuse sensing ranges of both the on-board sensor and the off-board sensor and unify information about the object detected by both the on-board sensor and the off-board sensor in a same coordinate system, to generate a view-angle fused view indicating the object; and, outputting an alarm information in response to a detection of an unsafe event.

2. The aircraft ground anti-collision system according to claim 1, wherein the view-angle fused view comprises an aerial view and/or a three-dimensional rendering view.

3. The aircraft ground anti-collision system according to claim 1, wherein the on-board sensor comprises a distance sensor and/or a vision sensor mounted on the aircraft, and the off-board sensor comprises a distance sensor and/or a vision sensor mounted on the trailer.

4. The aircraft ground anti-collision system according to claim 3, wherein at least one sensor mounted on the trailer is configured to be lifted and lowered relative to the trailer.

5. The aircraft ground anti-collision system according to claim 1, wherein the off-board sensor comprises a wearable sensor configured to be worn or held by an operator, wherein the operator comprises a wing protector located behind a wing of the aircraft during ground movement of the aircraft.

6. The aircraft ground anti-collision system according to claim 1, wherein the obstacle detection processing unit is configured to perform a risk assessment based on the data received from the plurality of sensors, and wherein the alarm information comprises at least one of a visual alarm, an auditory alarm, or a tactile alarm.

7. The aircraft ground anti-collision system according to claim 6, wherein the obstacle detection processing unit is configured to output the alarm information in response to detection of overspeed and/or presence of a person or an obstacle in a predetermined danger area.

8. The aircraft ground anti-collision system according to claim 6, further comprising:

a plurality of user interfaces, configured to communicate with the obstacle detection processing unit and communicate with each other to synchronously share information among a plurality of operators.

9. The aircraft ground anti-collision system according to claim 8, wherein the plurality of user interfaces are configured to receive and display the view-angle fused view generated by the obstacle detection processing unit.

10. The aircraft ground anti-collision system according to claim 8, wherein the plurality of user interfaces are configured to transmit the alarm information outputted by the obstacle detection processing unit to an operator.

11. The aircraft ground anti-collision system according to claim 8, wherein each of the plurality of user interfaces is configured to send an encoded instruction to the obstacle detection processing unit and/or the remaining of the plurality of user interfaces.

12. The aircraft ground anti-collision system according to claim 8, wherein the plurality of user interfaces comprise a head-up display and/or a head-mounted display device.

13. An aircraft ground anti-collision method, comprising:

processing data received from a plurality of sensors to detect an object around an aircraft and/or a trailer used for towing the aircraft, wherein the plurality of sensors comprise an on-board sensor located on the aircraft and an off-board sensor located outside the aircraft, fusing sensing ranges of both the on-board sensor and the off-board sensor, unifying information of the object detected by both the on-board sensor and the off-board sensor in a same coordinate system, outputting a view-angle fused view indicating the object, and thereby alarming a detection of an unsafe event.

14. The aircraft ground anti-collision method according to claim 13, wherein the view-angle fused view comprises an aerial view and/or a three-dimensional rendering view.

15. The aircraft ground anti-collision method according to claim 13, further comprising:

performing a risk assessment based on the data from the plurality of sensors and outputting alarm information in response to detection of an unsafe event, wherein the alarm information comprises at least one of a visual alarm, an auditory alarm, or a tactile alarm.

* * * * *